United States Patent
Tanishima

Patent Number: 5,953,045
Date of Patent: Sep. 14, 1999

[54] CHANNEL SELECTION TYPE RADIO TRANSMISSION APPARATUS

[75] Inventor: Yasuo Tanishima, Kawasaki, Japan

[73] Assignee: Fujitsu Limited, Kanagawa, Japan

[21] Appl. No.: 08/719,989

[22] Filed: Sep. 25, 1996

[30] Foreign Application Priority Data

Mar. 25, 1996 [JP] Japan ..................................... 8-067808

[51] Int. Cl.$^6$ .................................................. H04N 7/173
[52] U.S. Cl. ................................ 348/10; 348/11; 348/12; 348/7; 455/4.2; 455/5.1
[58] Field of Search .................................. 348/7, 9, 13, 6, 348/10, 11, 12; 455/3.1, 4.1, 4.2, 5.1, 6.1, 6.2; H04N 7/173

[56] References Cited

U.S. PATENT DOCUMENTS

| | | |
|---|---|---|
| 4,538,174 | 8/1985 | Gargini . |
| 4,994,909 | 2/1991 | Graves . |
| 5,708,961 | 1/1998 | Hylton ......................................... 348/7 |

*Primary Examiner*—Sherrie Hsia
*Attorney, Agent, or Firm*—Helfgott & Karas, P.C.

[57] ABSTRACT

A cable television network for transmitting video signals to subscribers through cables, comprising a video channel selection type radio transmission apparatus on a cable branch side in the network and a video channel selection type radio reception apparatus on a subscriber side. The video channel selection type radio transmission apparatus includes a channel selector for selecting a video signal for a channel designated by a channel selection signal which is transmitted from the subscriber. Also included are a frequency converter for converting the frequency of the selected video signal to a predetermined radio frequency and transmitting the video signal, and a receiver for the channel selection signal transmitted from the subscriber, and a controller of the video signal selecting operation of the channel selector. The radio reception apparatus includes a receiver for a video signal transmitted from the radio transmission apparatus, converting the received video signal to a predetermined frequency and transmitting the video signal to a television receiver of the subscriber, and a radio wave transmitter for transmitting the channel selection signal for designating the channel selected by the subscriber.

5 Claims, 10 Drawing Sheets

# CHANNEL SELECTION TYPE RADIO TRANSMISSION APPARATUS

BACKGROUND OF THE INVENTION

Field of the Invention

The present invention relates to a cable television network (CATV network) and a channel selection type radio transmission apparatus and, more particularly, to a cable television network for transmitting video signals to subscribers through cables and a channel selection type radio transmission apparatus which is provided on a cable branch side so as to transmit video signals on radio waves for a distance of about the last 100 m (between the subscriber's house and a terminal of the cable branch).

In a cable television network (CATV network), video signals for several ten channels are transmitted from the center station to a subscriber's house on optical cables or coaxial cables in the form of FDM (frequency division multiplex). In such a cable television network, it is sometimes impossible to install a cable from a cable branch point (tap) to a subscriber's house. For example, when there is a road, railway or a river between a cable branch point and a subscriber's house, it is difficult to install a cable therebetween. When the distance between a cable branch point and a subscriber's house is long, it is also difficult to install a cable therebetween. In such a place where it is difficult to install a cable, it is proposed to transmit video signals from a cable branch point to a subscriber's house on radio waves.

It is however difficult to transmit the video signals having all the several ten channels, which are transmitted on cables at frequencies of 70 MHz to 350 MHz (recently, 750 MHz), at radio frequencies because the same bandwidth as that of the cable is required. In broadband transmission, a modulation distortion generates in a nonlinear circuit such as a transmission amplifier, and leaks to an adjacent channel, in other words, adjacent channel interference is caused, so that an amplifier and a frequency converter having a high output are required, which leads to a large-scale apparatus and, hence, a rise in cost.

To avoid this problem, a cable television network (CATV network) and a radio apparatus for transmitting video signals having a narrow bandwidth from a cable branch point to a subscriber's house is demanded.

SUMMARY OF THE INVENTION

Accordingly, it is an object of the present invention to eliminate the above-described problems in the related art and to provide a CATV network and a video channel selection type radio transmission apparatus for transmitting video signals which are required by a subscriber from a cable branch point to the subscriber's house on radio waves having a narrow bandwidth It is another object of the present invention to provide a small-size video channel selection type radio transmission apparatus.

To achieve these objects, in one aspect of the present invention, there is provided a video channel selection type radio transmission apparatus which is provided on a cable branch side in a cable television network for transmitting video signals to subscribers through cables and which transmits a video signal to a subscriber on radio waves, the apparatus comprising a channel selector for selecting a video signal for a channel designated by a channel selection signal which is transmitted from the subscriber; a frequency converter for converting the frequency of a video signal for the channel which is selected by the channel selector to a predetermined radio frequency and transmitting the video signal; and a receiver and controller for receiving the channel selection signal transmitted from the subscriber and controlling the video signal selecting operation of the channel selector.

In another aspect of the present invention, there is provided a cable television network for transmitting video signals to subscribers through cables, comprising: a video channel selection type radio transmission apparatus which is provided on a cable branch side in the cable television network; and a video channel selection type radio reception apparatus which is provided on a subscriber side, the video channel selection type radio transmission apparatus including a channel selector for selecting a video signal for a channel designated by a channel selection signal which is transmitted from a subscriber via the video channel selection type radio reception apparatus; a frequency converter for converting the frequency of a video signal for the channel which is selected by the channel selector to a predetermined radio frequency and transmitting the video signal; and a receiver and controller for receiving the channel selection signal transmitted from the subscriber and controlling the video signal selecting operation of the channel selector, and the video channel selection type radio reception apparatus including: a receiver for receiving a video signal transmitted from the video channel selection type radio transmission apparatus, converting the frequency of the received video signal to a predetermined frequency and transmitting the video signal to a television receiver of the subscriber; and a transmitter for transmitting the channel selection signal for designating the channel selected by the subscriber on radio waves.

Other features and advantages of the present invention will be apparent from the following description taken in conjunction with the accompanying drawings.

Figure 1:
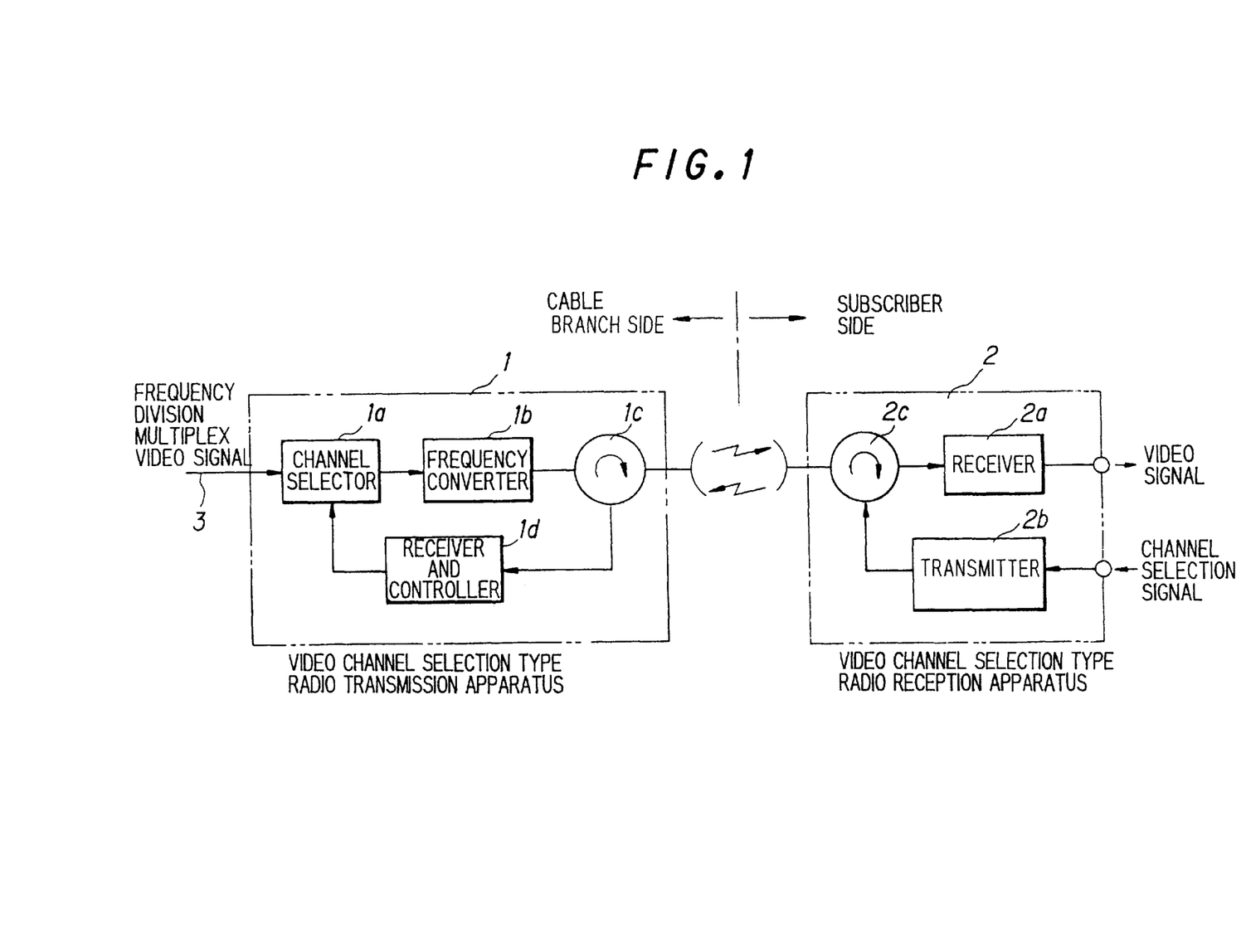
FIG. 1 schematically explains the structure of the present invention.

DESCRIPTION OF THE PREFERRED EMBODIMENTS (A) Schematic explanation of the invention FIG. 1 schematically explains the structure of the present invention. In FIG. 1, the reference numeral 1 represents a video channel selection type radio transmission apparatus provided on a cable branch side, 2 a video channel selection type radio reception apparatus provided on a subscriber side, and 3 a coaxial cable or an optical cable for transmitting video signals for several ten channels at frequencies of 70 MHz to 350 MHz (recently, 750 MHz). A video signal and a channel selection signal are transmitted and received on radio waves between the video channel selection type radio transmission apparatus 1 and the video channel selection type radio reception apparatus 2.

In the video channel selection type radio transmission apparatus 1, the reference numeral 1a represents a channel selector for selecting a video signal for a channel which is designated by the channel selection signal transmitted from a subscriber via the video channel selection type radio reception apparatus 2, 1b a frequency converter for converting the frequency of the video signal for the channel which is selected by the channel selector 1a to a predetermined radio frequency and transmitting the video signal, 1c a circulator, and 1d a receiver and controller for receiving the channel selection signal transmitted from the subscriber and controlling the video signal selecting operation of the channel selector 1a. In the video channel selection type radio reception apparatus 2, the reference numeral 2a denotes a receiver for receiving a video signal transmitted from the video channel selection type radio transmission apparatus 1 and converting the received signal to the original video signal, 2b a transmitter for transmitting the channel selection signal for designating the channel selected by a subscriber, and 2c a circulator.

In a subscriber's house, only video signals for 1 to 2 channels are required among video signals for a multiplicity of channels. As a result, if the channels required by the subscriber are known, it is only necessary to transmit video signals for those channels to the subscriber's house on radio waves. In this manner, it is possible to transmit video signals for required channels at radio frequencies having a narrow bandwidth. In addition, since it is possible to reduce the scale of the apparatus, the cost is lowered. For this purpose, a channel selection signal for designating the channel selected by the subscriber is transmitted from the transmitter 2b of the video channel selection type radio reception apparatus 2 to the video channel selection type radio transmission apparatus 1 on radio waves. The receiver and controller 1d of the video channel selection type radio transmission apparatus 1 demodulates the channel selection signal transmitted, identifies the selected channel and controls the video signal selecting operation of the channel selector 1a. The channel selector 1a converts the frequency of the video signal for the selected channel to an intermediate frequency, and the frequency converter 1b converts the frequency of the video signal to a predetermined radio frequency (GHz band) and transmits the video signal. The receiver 2a receives the high-frequency signal transmitted from the video channel selection type radio transmission apparatus 1, converts the high-frequency of the signal to an intermediate frequency and inputs the frequency-converted signal to a television receiver. In the above explanation, video signals for a multiplicity of channels are transmitted through cables, but this structure is applicable to signals other than video signals.

The receiver 2a can also transmits a video signal with the intermediate frequency from an antenna to the television receiver on radio waves. According to this structure, it is not necessary to connect the video channel selection type radio reception apparatus 2 and the television receiver by a cable, which is advantageous from the point of view of construction expenses and external appearance.

In another possible structure, the video channel selection type radio transmission apparatus 1 converts a video signal for the selected channel into an NTSC or PAL video signal, converts the frequency thereof to a milliwave band frequency after the frequency modulation, and transmits the NTSC or PAL video signal, and the video channel selection type radio reception apparatus 2 converts the frequency of the received signal, demodulates the NTSC or PAL video signal, and inputs the NTSC or PAL video signal to a video input terminal of the television receiver.

It is also possible to transmit and receive a video signal and a channel selection signal with the frequencies thereof converted to a milliwave band frequency between the cable branch point and the subscriber. Since the milliwave band has a short wavelength, it is attenuated by oxygen or the like, it is not flown far, and it has a directivity. For this reason, the frequency interference does not generate even if the radio frequencies are not varied with subscribers that results in the reduction of the required bandwidth.

(B) First embodiment (a) Entire structure of CATV network

Figure 2:
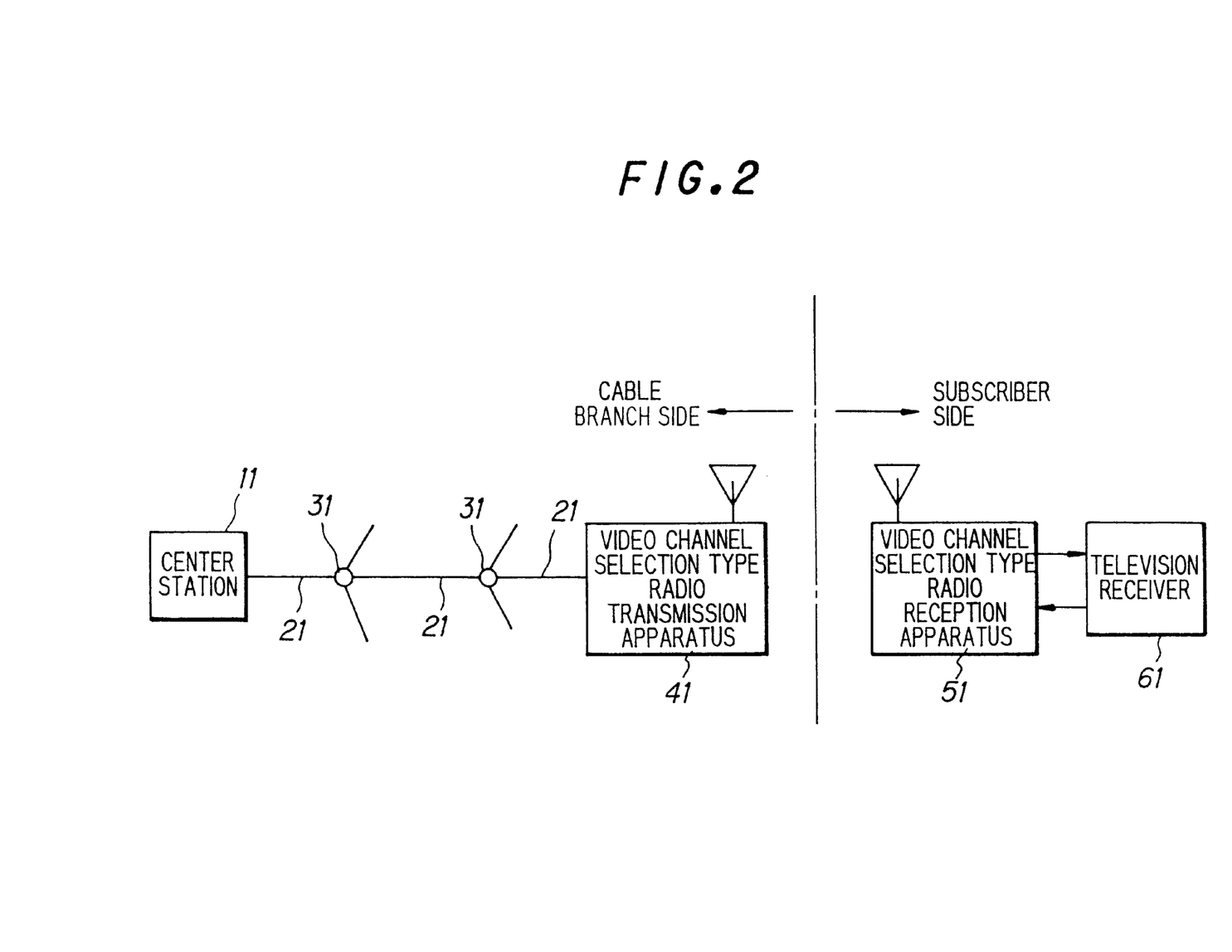
FIG. 2 shows the structure of a cable network according to the present invention.
Figure 3:
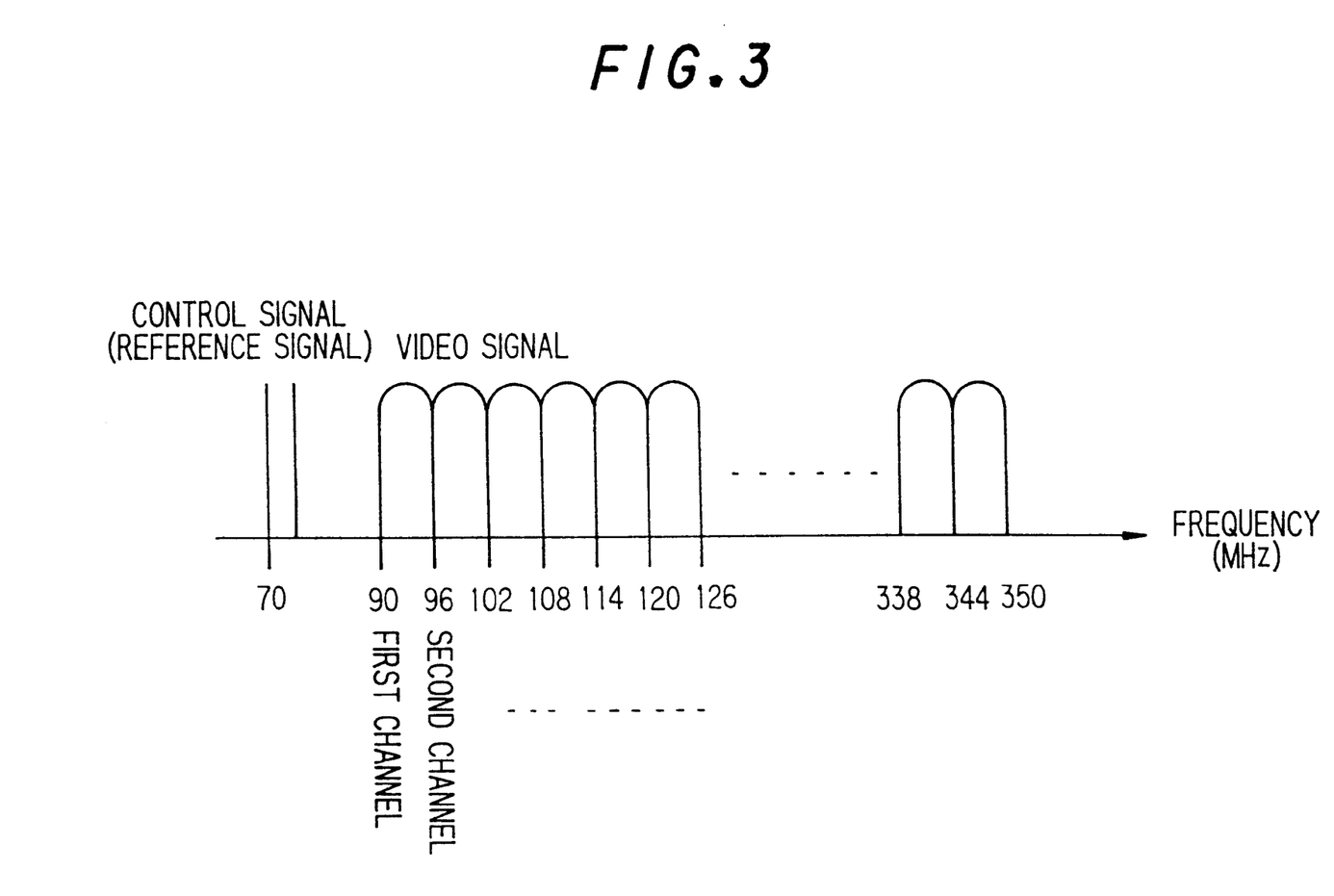
FIG. 3 is an explanatory view of the arrangement of cable signals.

FIG. 2 shows the structure of a cable television network (CATV network) according to the present invention. The reference numeral 11 represents the center station of the CATV which transmits video signals for several ten channels in the form of frequency division multiplex (see FIG. 3), 21 a coaxial cable or an optical cable for transmitting video signals, 31 a cable branch point, 41 a video channel selection type radio transmission apparatus provided on the cable branch side, 51 a video channel selection type radio reception apparatus provided on a subscriber side and 61 a television receiver. FIG. 3 is an explanatory view of the arrangement of the video signals. The video signals for several ten channels are arranged in a frequency bandwidth of 70 MHz to 350 MHz (recently, 750 MHz) with an frequency interval of 6 MHz and each video signal for each channel is transmitted in the form of frequency division multiplex 70 MHz is a bandwidth for transmitting a control signal.

In the CATV, only video signals for 1 to 2 channels are required among the video signals for a multiplicity of channels in a subscribers house. As a result, if the channels required by the subscriber are known, it is only necessary to transmit video signals for those channels to the subscriber's house on radio waves.

Consequently, for example, when there is a road, railway or a river between a cable branch point and a subscriber's house, and it is necessary to install a cable therebetween or when the distance between a cable branch point and a subscriber's house is long, the video channel selection type radio transmission apparatus 41 is provided on the cable branch side, and the video channel selection type radio reception apparatus 51 is provided on the subscriber side. The video channel selection type radio reception apparatus 51 transmits a channel selection signal for designating a channel which is selected by the subscriber to the video channel selection type radio transmission apparatus 41 on radio waves, and the video channel selection type radio transmission apparatus 41 selects a video signal for a channel designated by the channel selection signal and converts the frequency of the video signal to a milliwave band frequency and thereafter transmits the video signal to the video channel selection type radio apparatus 51. The video channel selection type radio reception apparatus 51 receives the transmitted high-frequency video signal in the milliwave band, converts the frequency of the high-frequency video signal to an intermediate frequency and inputs the video signal with the intermediate frequency to the television receiver 61.

(b) Video channel selection type radio transmission apparatus

Figure 4:
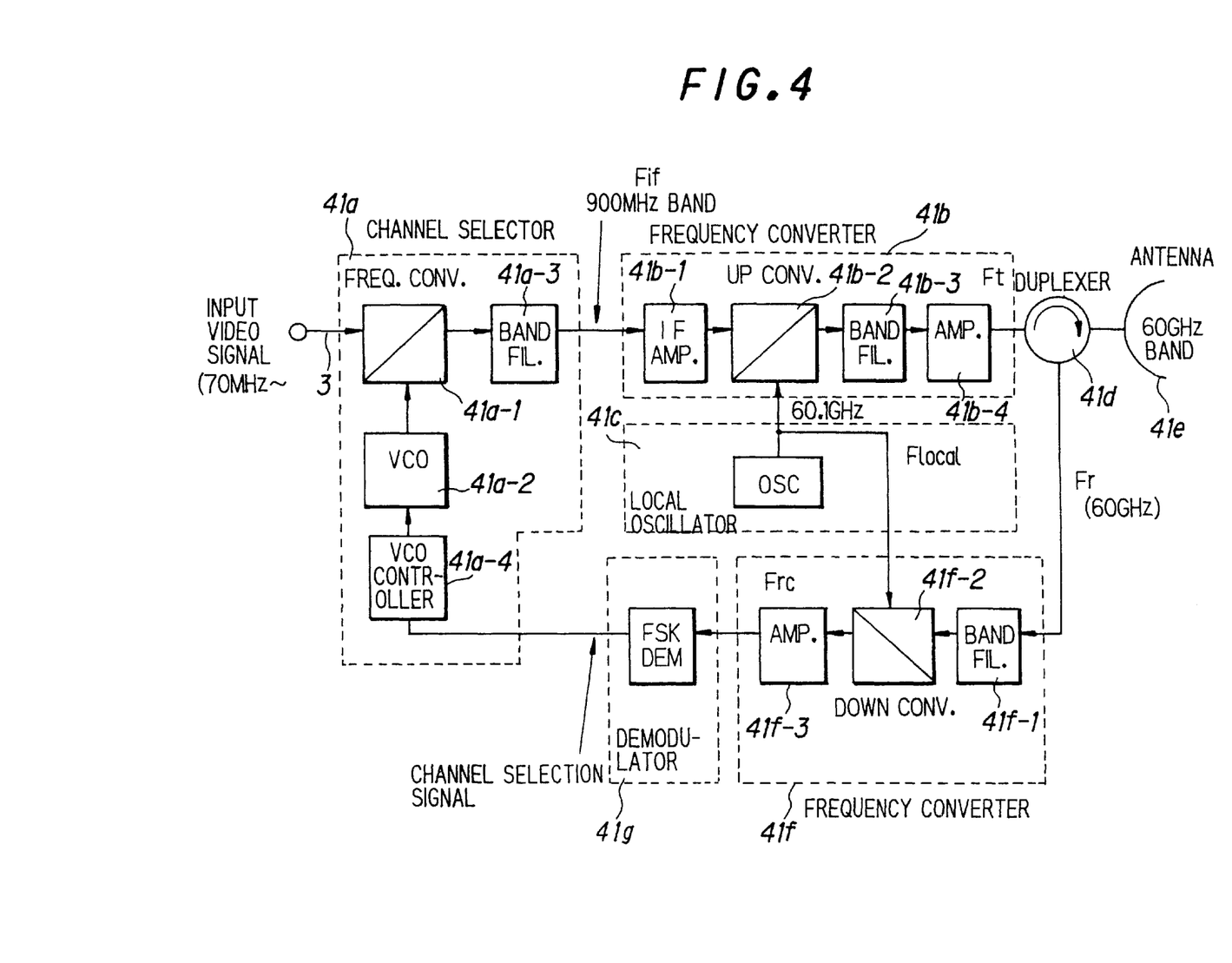
FIG. 4 shows the structure of a first embodiment of a video channel selection type radio transmission apparatus.

FIG. 4 shows the structure of an embodiment of a video channel selection type radio transmission apparatus 41. In FIG. 4, the reference numeral 41a represents a channel selector for selecting a video signal for a designated channel from the video signals for a multiplicity of channels which are transmitted through the cable 3, and converting the video signal into an intermediate frequency signal Fif having a predetermined frequency (900 MHz). The channel selector 41a includes a frequency converter 41a-1, a VCO (variable frequency oscillator) 41a-2, a 900-MHz band-pass filter (BAND FIL.) 41a-3 and a VCO controller 41a-4. The VCO controller 41a-4 identifies the channel selected by the subscriber in accordance with the channel selection control signal which is transmitted from the video channel selection type radio reception apparatus 51 (see FIG. 2) and oscillates the VCO 41a-2 at a predetermined frequency so as to obtain an intermediate frequency signal having a frequency of 900 MHz. For example, when a first channel (channel frequency is 90 MHz) is selected, the VCO controller 41a-4 so controls the VCO 41a-2 as to oscillate at a frequency of 810 MHz. The frequency converter 41a-1 mixes video signals for a multiplicity of channels transmitted in the form of frequency division multiplex and a local oscillation frequency signal output from the VCO 41a-2, and the band-pass filter 41a-3 passes only an intermediate frequency signal having a frequency of 900 MHz, that is, an intermediate frequency signal which corresponds to the video signal for the selected channel.

The reference numeral 41b denotes a frequency converter for mixing a signal Flocal (60.1 GHz) output from a local oscillator and the intermediate frequency signal Fif having a frequency of 900 MHz and converting the frequency of the intermediate frequency signal to a required frequency (61 GHz). The frequency converter 41b includes a 900-MHz band intermediate frequency amplifier (IF AMP) 41b-1, a frequency converter (UP CONV) 41b-2, a milliwave band-pass filter (BAND FIL.) 41b-3 and a transmission amplifier (AMP) 41b-4 for producing a predetermined transmission output Ft. The reference numeral 41c represents a local oscillator for producing a required frequency (61 GHz) which outputs a local oscillation frequency signal having a frequency of 60.1 GHz, 41d a duplexer composed of a circulator for separating a transmitted wave Ft and a received wave Fr, and 41e an antenna.

The reference numeral 41f denotes a frequency converter for converting the frequency of a signal Fr in a milliwave band (60 GHz) which is transmitted from the video channel selection type radio reception apparatus 51 on the subscriber side to 100 MHz. The frequency converter 41f is provided with a milliwave band-pass filter (BAND FIL) 41f-1, a frequency converter (DOWN CONV) 41f-2 for mixing the received signal having a frequency of 60 GHz and a local oscillation signal having a frequency of 60.1 GHz and converting the frequency of the received signal to an intermediate frequency signal in a 100 MHz band, and an intermediate frequency amplifier (IF AMP) 41f-3.

The reference numeral 41g represents an FSK demodulator for demodulating a channel selection control signal from the intermediate frequency signal Frc having a frequency of 100 MHz and inputting the demodulated signal to the VCO controller 41a-4.

(c) Video channel selection type radio reception apparatus

Figure 5:
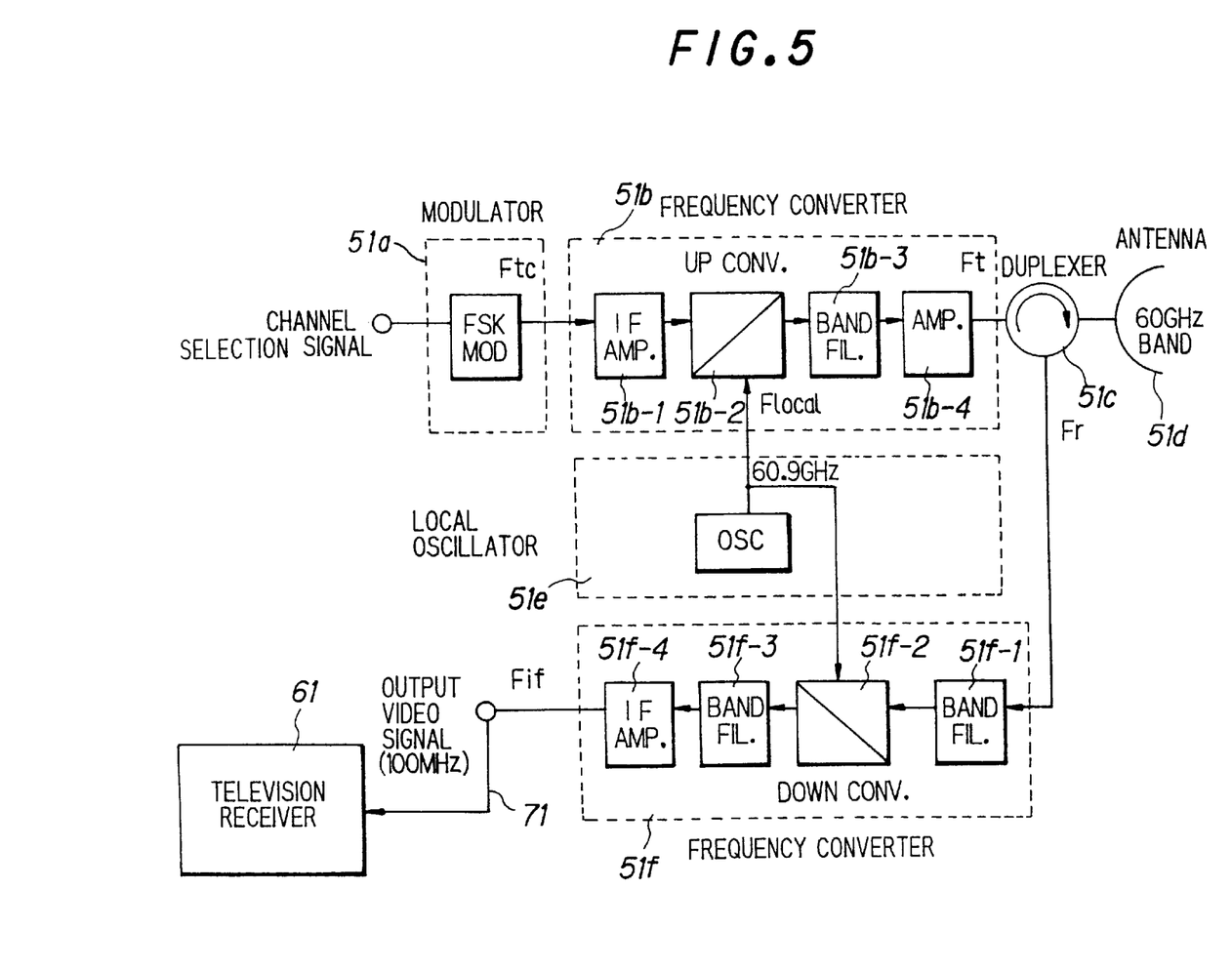
FIG. 5 shows the structure of a first embodiment of a video channel selection type radio reception apparatus.

FIG. 5 shows the structure of an embodiment of a video channel selection type radio reception apparatus 51. In FIG. 5, the reference numeral 51a represents an FSK modulator which executes FSK modulation based upon a channel selection signal for designating the channel which is selected by a subscriber so as to convert the signal into an intermediate frequency signal Ftc having a frequency of 900 MHz, 51b a frequency converter for mixing the signal Flocal output from a local oscillator and the intermediate frequency signal Ftc having a frequency of 900 MHz and converting the frequency of the intermediate frequency signal to a required frequency (60 GHz). The frequency converter 51b includes a 900-MHz band intermediate frequency amplifier (IF AMP) 51b-1, a frequency converter (UP CONV) 51b-2, a milliwave bandpass filter (BAND FIL.) 51b-3 and a transmission amplifier (AMP) 51b-4 for producing a predetermined transmission output Ft. The reference numeral 51c represents a duplexer composed of a circulator for separating a transmitted wave Ft and a received wave Fr, and 51d an antenna.

The reference numeral 51e represents a local oscillator for producing a required frequency (60 GHz) which outputs a local oscillation frequency signal Flocal having a frequency of 60.9 GHz, 51f a frequency converter for converting the frequency of a signal Fr in a milliwave band (61 GHz) which is transmitted from the video channel selection type radio transmission apparatus 41 on the cable branch side to 100 MHz and inputting the frequency-converted signal Fif to the television receiver 61. The frequency converter 51f is provided with a milliwave band-pass filter (BAND FIL) 51f-1, a frequency converter (DOWN CONV) 51f-2 for mixing the received signal having a frequency of 61 GHz and a local oscillation signal Flocal having a frequency of 60.9 GHz and generating an intermediate frequency signal Fif in a 100 MHz band, a 100-MHz band-pass filter (BAND FIL.) 51f-3 and a 100-MHz band intermediate frequency amplifier (IF AMP) 51f-4. The output terminal of the 100-MHz band intermediate frequency amplifier 51f-4 is connected to the television receiver 61 through a cable 71.

(d) Operation

Figure 6A:
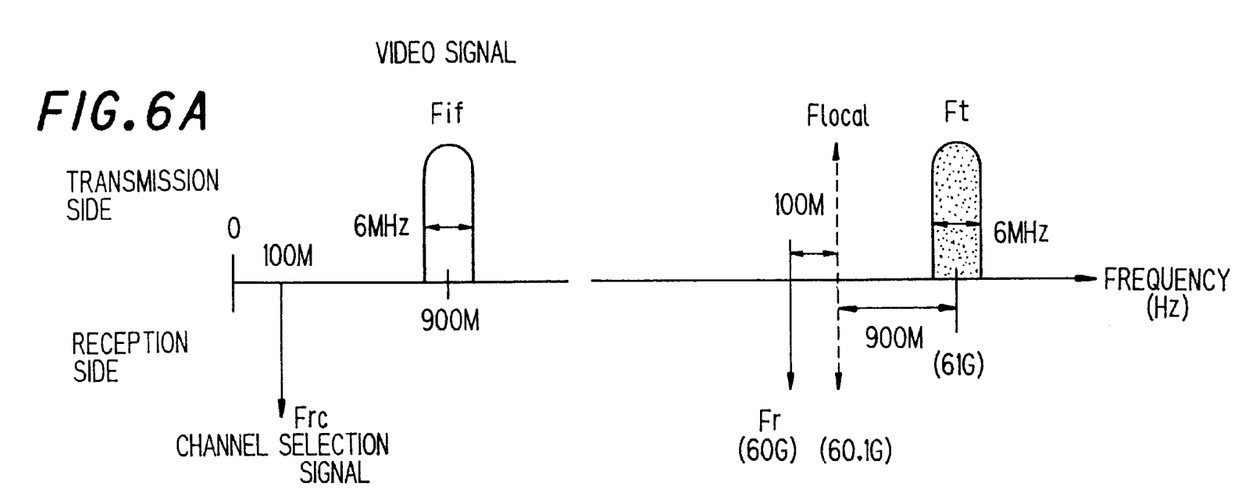
FIGS. 6A and 6B are explanatory views of the arrangement of radio frequencies.
Figure 6B:
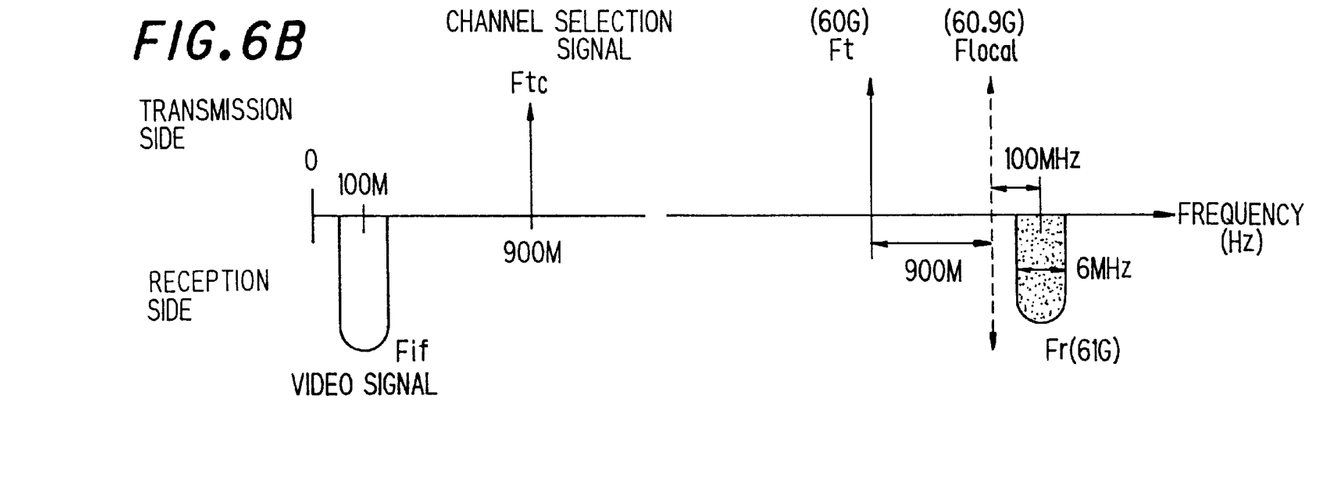

FIGS. 6A and 6B are explanatory views of the arrangement of radio frequencies, wherein FIG. 6A shows the arrangement of radio frequencies on the cable branch side, and FIG. 6B shows the arrangement of radio frequencies on the subscriber side.

When a channel is selected by a channel selector (not shown), the FSK modulator 51a of the video channel selection type radio reception apparatus 51 (FIG. 5) converts a channel selection signal into an intermediate frequency signal Ftc having a frequency of 900 MHz (see FIG. 6B) by FSK modulation. The frequency converter 51b mixes the local oscillation signal Flocal having a frequency of 60.1 GHz which is output from the local oscillator 51e and the intermediate frequency signal Ftc having a frequency of 900 MHz and converts the frequency of the intermediate frequency signal to a required frequency (60 GHz). Thereafter, the frequency converter 51b amplifies the amplitude of the frequency-converted signal and transmits the thus-obtained transmission signal Ft from the antenna 51d.

The frequency converter 41f of the video channel selection type radio transmission apparatus 41 (FIG. 4) converts the frequency of a received signal Fr in a milliwave band (60 GHz) which is transmitted from the video channel selection type radio reception apparatus 51 on the subscriber side to 100 MHz and the FSK demodulator 41g demodulates a channel selection signal from the intermediate frequency signal Frc having a frequency of 100 MHz (see FIG. 6A and inputs the demodulated signal to the channel selector 41a.

The channel selector 41a identifies the channel selected by the subscriber in accordance with the input channel selection signal, converts the video signal for the selected channel into an intermediate frequency signal Fif having a frequency of 900 MHz (see FIG. 6A) and outputs the signal. The frequency converter 41b mixes the local oscillation signal Flocal having a frequency of 60.1 GHz which is output from the local oscillator 41c and the intermediate frequency signal Fif having a frequency of 900 MHz and converts the frequency of the intermediate frequency signal to a required frequency (61 GHz). Thereafter, the frequency converter 41b amplifies the amplitude of the mixed signal and transmits the transmission signal Ft thus obtained from the antenna 41e.

The frequency converter 51f of the video channel selection type radio reception apparatus 51 (FIG. 5) on the subscriber side converts the frequency of a received signal Fr in a milliwave band (61 GHz) which is transmitted from the video channel selection type radio transmission apparatus 41 to 100 MHz and after the intermediate frequency amplification of the signal having a frequency of 100 MHz, the frequency converter 51f inputs the thus-obtained video signal Fif to the television receiver 61. The television receiver 61 outputs a video and sound by using the video signal Fif having a frequency of 100 MHz.

According to this embodiment, since all the video channel selection type radio reception apparatus 41 on the cable branch side has to do is to take out the video signal selected by the subscriber, convert the frequency thereof to a required milliwave band frequency (61 GHz) and transmit the signal from the antenna, it is possible to limit the required radio bandwidth to the minimum and, hence, to reduce the scale of the apparatus.

Figure 7:
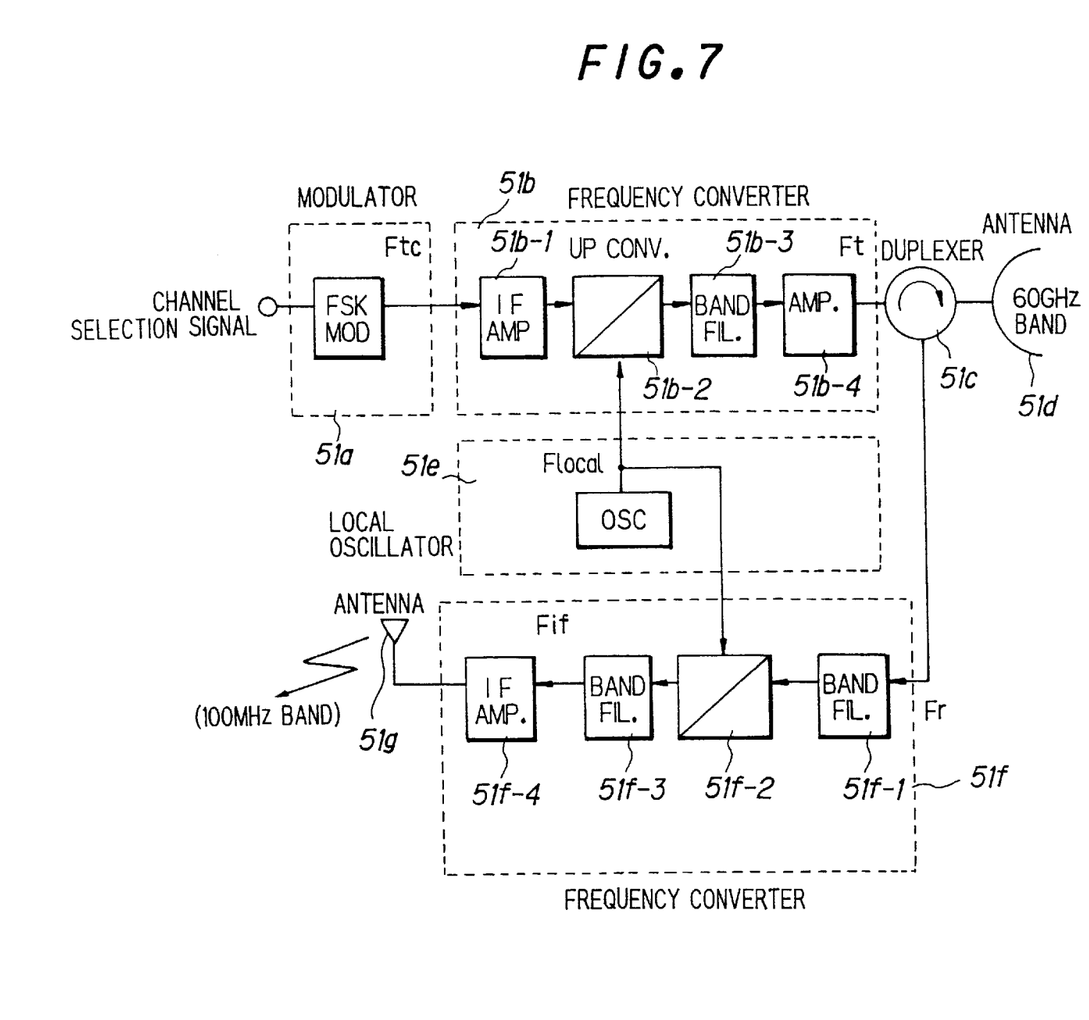
FIG. 7 shows a modification of the video channel selection type radio reception apparatus shown in FIG. 5.

In addition, since the milliwave band has a short wavelength, it is attenuated by oxygen or the like, it is not flown far, and it has a directivity. For this reason, the frequency interference does not generate even if the radio frequencies are not varied with subscribers that results in the reduction of the required bandwidth (e) Modification of video channel selection type radio reception apparatus In the video channel selection type radio reception apparatus 51 shown in FIG. 5, a video signal Fif having a frequency of 100 MHz is input to the television receiver 61 through the cable 71. Alternatively, the video signal Fif may be transmitted to the television receiver 61 on radio waves. FIG. 7 shows such a structure. The same reference numerals are provided for the elements which are the same as those shown in FIG. 5. The modification is different from the video channel selection type radio reception apparatus 51 shown in FIG. 5 in that an antenna 51g is provided and in that the output of the 100-MHz band intermediate frequency amplifier (IF AMP) 51f-4 is connected to the antenna 51g.

The frequency converter 51f converts the frequency of a received signal Fr in a milliwave band (61 GHz) which is transmitted from the video channel selection type radio transmission apparatus 41 to 100 MHz and after the intermediate frequency amplification of the thus-obtained video signal Fif having a frequency of 100 MHz, the frequency converter 51f inputs the video signal Fif to the antenna 51g. The antenna 51g transmits the input video signal Fif having a frequency of 100 MHz to the television receiver 61. The television receiver 61 receives the signal and outputs a video and sound.

(C) Second embodiment (a) Schematic explanation of second embodiment

In the first embodiment, the video channel selection type radio transmission apparatus 41 converts the video signal for the channel selected by the subscriber into an intermediate frequency signal, converts the frequency thereof to a milliwave band frequency after the frequency modulations and transmits the video signal. Alternatively, it is possible that the video channel selection type radio reception apparatus 41 converts the video signal for the selected channel into an NTSC or PAL video signal, multiplies the frequency thereof to a milliwave band frequency after the frequency modulation, and transmit the NTSC or PAL video signal and that the video channel selection type radio reception apparatus 51 demodulates the NTSC or PAL video signal by frequency demodulation, and inputs the signal to the television receiver 61.

(b) Video channel selection type radio transmission apparatus

Figure 8:
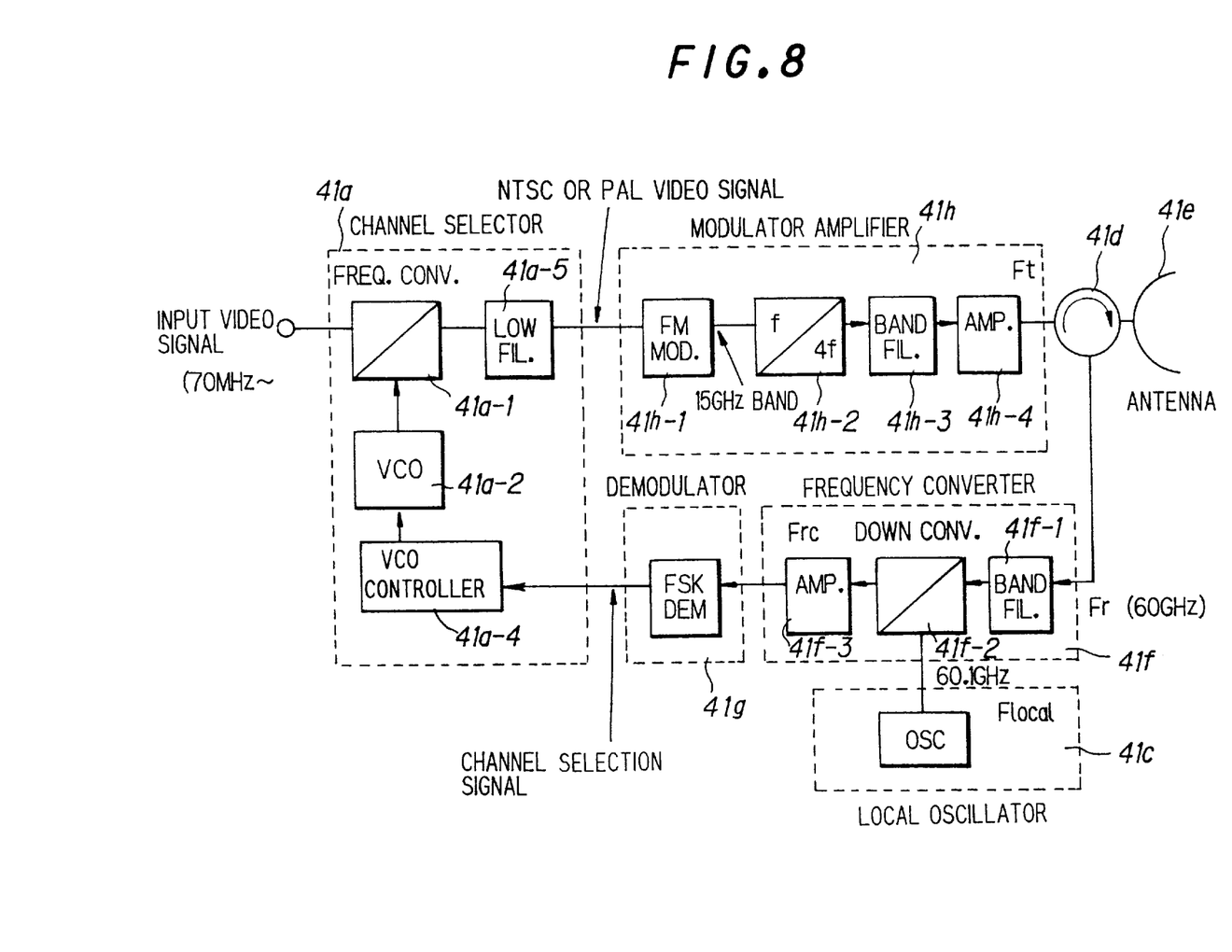
FIG. 8 shows the structure of a second embodiment of a video channel selection type radio transmission apparatus.

FIG. 8 shows the structure of a second embodiment of a video channel selection type radio transmission apparatus 41. In FIG. 8, the reference numeral 41a represents a channel selector into which video signals for a multiplicity of channels transmitted from a cable network are input, and which converts a video signal for the channel selected by the subscriber into an NTSC or PAL video signal and outputs the signal. The channel selector 41a includes a frequency converter 41a-1, a VCO (variable frequency oscillator) 41a-2, a VCO controller 41a-4 and a lowpass filter (LOW. FIL.) 41a-5. The VCO controller 41a-4 identifies the channel selected by the subscriber in accordance with the channel selection signal which is transmitted from the video channel selection type radio reception apparatus 51 on the subscriber side and oscillates the VCO 41a-2 at a predetermined frequency so as to output an NTSC or PAL video signal for the selected channel. For example, when a first channel (channel frequency is 90 MHz) is selected, the VCO controller 41a-4 so controls the VCO 41a-2 as to oscillate at a frequency of 90 MHz. The frequency converter 41a-1 mixes video signals for a multiplicity of channels transmitted in the form of frequency division multiplex and a local oscillation frequency signal output from the VCO 41a-2, and the lowpass filter 41a-5 passes the NTSC or PAL video signal for the selected channel. The video signals for the channels are produced by modulating NTSC or PAL video signals (which have a bandwidth of 6 MHz) with the frequencies which correspond to the respective channels (90 MHz for a first channel, 96 MHz for a second channel, . . . ) by FM modulation.

The reference numeral 41h represents a modulator amplifier for modulating a frequency signal having a frequency of 15 GHz with the NTSC or PAL video signal for the selected channel by FM modulation, multiplies the modulated wave to 60 GHz band (61 GHz), and outputs the modulated signal. The modulator amplifier 41h is provided with an FM modulator 41h-1 for modulating the frequency signal having a frequency of 15 GHz with an NTSC or PAL video signal, a frequency multiplier 41h-2 for multiplying the frequency by 4 so as to convert the signal from 15 GHz band to 60 GHz band, a milliwave bandpass filter (BAND FIL) 41h-3 and a transmission amplifier (AMP) 41h-4 for producing a transmission output Ft. The reference numeral 41c represents a local oscillator for outputting a local oscillation frequency signal having a frequency of 60.1 GHz, 41d a duplexer composed of a circulator for separating a transmitted wave Ft and a received wave Fr, and 41e an antenna.

The reference numeral 41f denotes a frequency converter for converting the frequency of a received signal Fr in a milliwave band (60 GHz) which is transmitted from the video channel selection type radio reception apparatus 51 on the subscriber side to 100 MHz. The frequency converter 41f is provided with a milliwave band-pass filter (BAND FIL)

41*f*-1, a frequency converter (DOWN CONV) 41*f*-2 for mixing the received signal and a local oscillation signal having a frequency of 60.1 GHz and converting the received signal to an intermediate frequency signal in a 100 MHz band, and a 100-MHz band intermediate frequency amplifier (IF AMP) 41*f*-3.

The reference numeral 41*g* represents an FSK demodulator for demodulating a channel selection signal from the intermediate frequency signal Frc having a frequency of 100 MHz and inputting the demodulated signal to the VCO controller 41*a*-4.

(c) Video channel selection type radio reception apparatus

Figure 9:
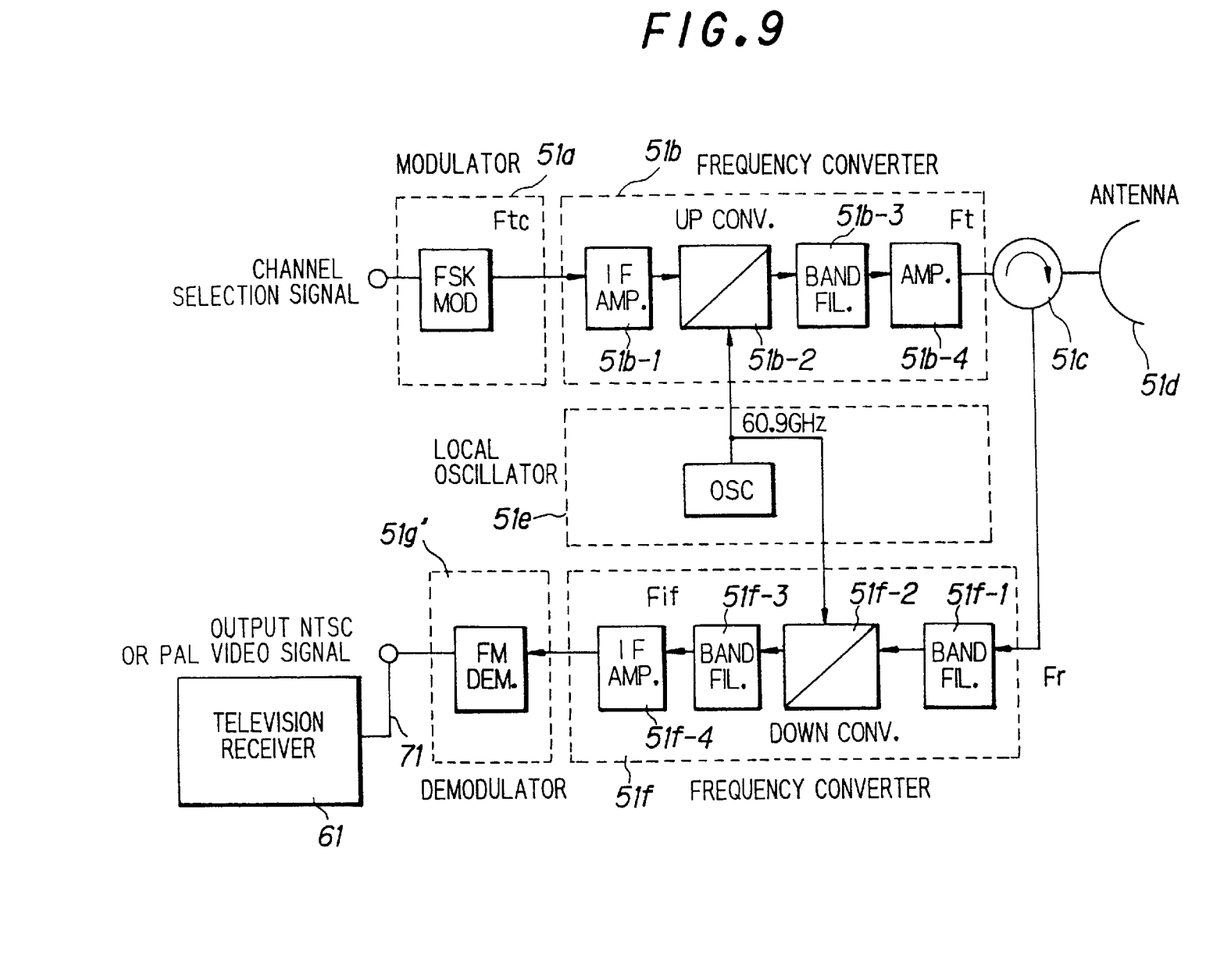
FIG. 9 shows the structure of a second embodiment of a video channel selection type radio reception apparatus.

FIG. 9 shows the structure of a second embodiment of a video channel selection type radio reception apparatus 51. In FIG. 9*e* the same reference numerals are provided for the elements which are the same as those in the first embodiment shown in FIG. 5. The second embodiment is different from the first embodiment in that an FM demodulator 51*g'* for demodulating an NTSC or PAL video signal is provided at the next stage of the frequency converter 51*f* and in that the NTSC or PAL video signal output from the FM demodulator 51*g'* is connected to the television receiver 61 through the cable 71.

(d) Operation

When a channel is selected by a subscriber using a channel selector (not shown), the FSK modulator 51*a* of the video channel selection type radio reception apparatus 51 (FIG. 9) converts the channel selection signal into an intermediate frequency signal Ftc having a frequency of 900 MHz (see FIG. 6B) by FSK modulation The frequency converter 51*b* mixes the local oscillation signal Flocal having a frequency of 60.1 GHz which is output from the local oscillator 51*e* and the intermediate frequency signal Ftc having a frequency of 900 MHz, and converts the frequency of the intermediate frequency signal to a required frequency (60 GHz). Thereafter, the frequency converter 51*b* amplifies the amplitude of the mixed signal and transmits the thus-obtained transmission signal Ft from the antenna 51*d*.

The frequency converter 41*f* of the video channel selection type radio transmission apparatus 41 (FIG. 8) converts the frequency of a received signal Fr in a milliwave band (60 GHz) which is transmitted from the video channel selection type radio reception apparatus 51 on the subscriber side to 100 MHz and the FSK demodulator 41*g* demodulates a channel selection signal from the intermediate frequency signal Frc having a frequency of 100 MHz (see FIG. 6A and inputs the demodulated signal to the channel selector 41*a*.

The channel selector 41*a* identifies the channel selected by the subscriber in accordance with the input channel selection signal, and outputs the NTSC or PAL video signal for the selected channel. The modulator amplifier 41*h* modulates the signal in a 15 GHz band with the input NTSC or PAL video signal by FM modulation, multiplies the modulated wave to 60 GHz band (61 GHz), and outputs the modulated signal.

The frequency converter 51*f* of the video channel selection type radio reception apparatus 51 (FIG. 9) converts the frequency of a received signal Fr in a milliwave band (61 GHz) which is transmitted from the video channel selection type radio transmission apparatus 41 to 100 MHz and after the intermediate frequency amplification of the thus-obtained video signal having a frequency of 100 MHz, the frequency converter 51*f* inputs the video signal to the FM demodulator 51*g'*. The FM demodulator 51*g'* demodulates the NTSC or PAL video signal from the input signal, and inputs the NTSC or PAL video signal to the television receiver 61. The television receiver 61 outputs a video and sound by using the input NTSC or PAL video signal.

According to this embodiment, since all the video channel selection type radio reception apparatus 41 on the cable branch side has to do is to take out the NTSC or PAL video signal selected by the subscriber for FM modulation, multiply the frequency of the FM modulated wave to a required milliwave band frequency (60 GHz band) and transmit the signal from the antenna, it is possible to limit the required radio bandwidth to the minimum and, hence, to reduce the scale of the apparatus. In addition, since the milliwave band has a short wavelength, it is attenuated by oxygen or the like, it is not flown far, and it has a directivity. For this reason, the frequency interference does not generate even if the radio frequencies are not varied with subscribers that results in the reduction of the required bandwidth.

(D) Third embodiment (a) Schematic explanation of third embodiment

In the first embodiment, the video channel selection type radio transmission apparatus 41 on the cable branch side takes out the video signal for only one channel selected by the subscriber, converts the frequency thereof into a required milliwave band frequency (61 GHz) and transmits the signal from the antenna. Alternatively, the video channel selection type radio transmission apparatus 41 may have a structure which enables video signals for a plurality of channels to be taken out, the frequency thereof to be converted into a required milliwave band frequency (61 GHz) and the signal to be transmitted from the antenna to the video channel selection type radio reception apparatus on the subscriber side when the subscriber selects a plurality of channels.

(b) Structure

Figure 10:
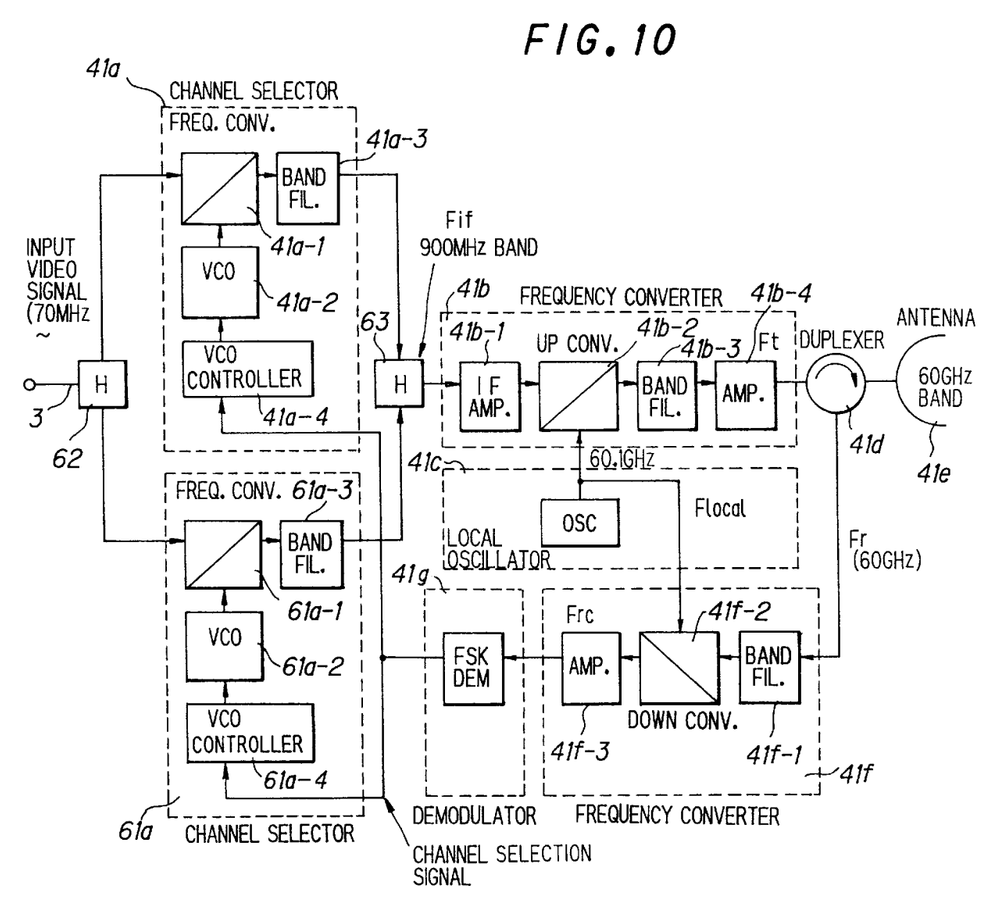
FIG. 10 shows the structure of a third embodiment of a video channel selection type radio transmission apparatus

FIG. 10 shows the structure of a third embodiment of a video channel selection type radio transmission apparatus for taking out video signals for the two channels selected by the subscriber and transmitting the signals from the antenna. The same reference numerals are provided for the elements which are the same as those in the first embodiment shown in FIG. 4.

The third embodiment is different from the first embodiment in that (1) it is provided with a second channel selector 61*a* having the same structure as the first channel selector 41*a* in addition to the first channel selector 41*a*, (2) it is provided with a hybrid circuit 62 for inputting the video signals for a multiplicity of channels which are transmitted through the cable 3 into the first channel selector 41*a* and the second channel selector 61*a* separately from each other, (3) the channel selection signal transmitted from the video channel selection type radio reception apparatus 51 (see FIG. 5) on the subscriber side is input to the VCO controllers 41*a*-4, 61*a*-4 of the first and second channel selectors 41*a* and 61*a*, respectively, and (4) it is provided with a hybrid circuit 63 for mixing the intermediate frequency video signal for the first selected channel which is output from the first channel selector 41*a* and the intermediate frequency video signal for the second selected channel which is output from the second channel selector 61*a* and outputting the synthesized signal to the frequency converter 41*b*.

The channel selector 61*a* selects the video signal for the second selected channel from the video signals for a multiplicity of channels which are transmitted through the cable 3, and converts the video signal into an intermediate frequency signal Fif having a predetermined frequency (900 MHz band). The channel selector 61*a* includes a frequency converter 61a-1, a VCO (variable frequency oscillator) 61a-2, a 900-MHz band-pass filter (BAND FIL.) 61a-3, and a VCO controller 61a-4.

(c) Operation

After the selection of the first and second channels by a subscriber, the video channel selection type radio reception apparatus 51 (FIG. 5) converts the channel selection signal into an intermediate frequency signal having a frequency of 900 MHz by FSK modulation. The video channel selection type radio reception apparatus 51 then converts the frequency of the signal to a required frequency (60 GHz) and transmits the signal from the antenna.

The frequency converter 41f of the video channel selection type radio transmission apparatus 41 (FIG. 10) converts the frequency of a received signal Fr in a milliwave band (60 GHz) which is transmitted from the video channel selection type radio reception apparatus 51 to 100 MHz and the FSK demodulator 41g demodulates a channel selection signal from the intermediate frequency signal Frc having a frequency of 100 MHz and inputs the demodulated signal to the channel selectors 41a and 61a.

The channel selector 41a identifies the first channel selected by the subscriber in accordance with the input channel selection signal, converts the video signal for the first selected channel into an intermediate frequency signal Fif having a frequency of 900 MHz and outputs the signal. The channel selector 61a identifies the second channel selected by the subscriber in accordance with the input channel selection signal, converts the video signal for the second selected channel into an intermediate frequency signal Fif having a frequency of 900 MHz and outputs the signal.

The hybrid circuit 63 mixes the intermediate frequency video signal for the first selected channel which is output from the channel selector 41a and the intermediate frequency video signal for the second selected channel which is output from the channel selector 61a and outputs the synthesized signal to the frequency converter 41b.

The frequency converter 41b mixes the local oscillation signal Flocal having a frequency of 60.1 GHz which is output from the local oscillator 41c and the synthesized intermediate frequency signal Fif having a frequency of 900 MHz and converts the frequency of the synthesized intermediate frequency signal to a required frequency (61 GHz). Thereafter, the frequency converter 41b amplifies the amplitude of the mixed signal and transmits the thus-obtained transmission signal Ft from the antenna 41e.

The video channel selection type radio reception apparatus 51 (FIG. 5) on the subscriber side converts the frequency of a received signal Fr in a milliwave band (61 GHz) which is transmitted from the video channel selection type radio transmission apparatus 41 to 100 MHz and after the intermediate frequency amplification of the thus-obtained video signal Fif, the video channel selection type radio reception apparatus 51 inputs the video signal Fif to the television receiver 61 through a cable or on radio waves. The television receiver 61 selects a desired channel and outputs a video and sound by using the video signal Fif having a frequency of 100 MHz. It is also possible to input video signal Fif from the video channel selection type radio reception apparatus 51 to two television receivers so that each television receiver outputs a video and sound for the different channel.

In each of the above-described embodiments, video signals for a multiplicity of channels are transmitted, but it goes without saying that the present invention is applicable not only to the transmission of video signals but also to other signals for a multiplicity of channels.

As described above, according to the present invention, the channel selection signal for designating the channel selected by the subscriber is transmitted to the video channel selection type radio transmission apparatus on the cable branch side, and the video channel selection type radio transmission apparatus demodulates the transmitted channel selection signal so as to identify the channel selected by the subscriber, and converts a signal, for example, a video signal for the selected channel into an intermediate frequency signal, converts the frequency of the signal to a predetermined radio frequency (GHz band) and transmits the signal to the video channel selection type radio reception apparatus on the subscriber side. The video channel selection type radio reception apparatus on the subscriber side receives high-frequency signal transmitted from the video channel selection type radio transmission apparatus on the cable branch side, converts the frequency of the received signal and inputs the signal to the television receiver. Owing to this structure, the video channel selection type radio transmission apparatus 41 on the cable branch side has only to take out the signal (video signal) for the channel selected by the subscriber, convert the frequency thereof to a required milliwave band frequency (61 GHz) and transmit the signal from the antenna. It is therefore possible to limit the required radio bandwidth to the minimum and, hence, to reduce the scale of the apparatus. In addition, since the milliwave band has a short wavelength, it is attenuated by oxygen or the like, it is not flown far, and it has a directivity. For this reason, the frequency interference does not generate even if the radio frequencies are not varied with subscribers that results in the reduction of the required bandwidth.

According to the present invention, since the video channel selection type radio reception apparatus on the subscriber side transmits a video signal from an antenna to a television receiver, it is not necessary to connect the video channel selection type radio reception apparatus and the television receiver by a cable, which is advantageous from the point of view of construction expenses and external appearance.

In addition, according to the present invention, the video channel selection type radio transmission apparatus on the cable branch side converts a video signal for the selected channel into an NTSC or PAL video signal, modulates the NTSC or PAL video signal by FM modulation, multiplies the frequency of the modulated wave to a required milliwave band frequency and transmits the signal. The video channel selection type radio reception apparatus on the subscriber side converts the frequency of the reception signal, demodulates the NTSC or PAL video signal by FM demodulation, and inputs the NTSC or PAL video signal to the video input terminal of the television receiver. Since the video channel selection type radio transmission apparatus on the cable branch side has only to take out the NTSC or PAL video signal selected by the subscriber, and transmit it from the antenna after FM modulation, it is possible to limit the required radio bandwidth to the minimum and, hence, to reduce the scale of the apparatus.

Furthermore, according to the present invention, since a video signal, a channel selection signal, etc. are transmitted and received between a cable branch point and a subscriber after conversion of the signals to signals in a milliwave band, it is possible to reduce the required bandwidth without interference even if the radio frequencies are not varied with subscribers.

As many apparently widely different embodiments of the present invention can be made without departing from the spirit and scope thereof, it is to be understood that the invention is not limited to the specific embodiments thereof except as defined in the appended claims.

What is claimed is:

1. A cable television network for transmitting video signals to subscribers through cables, comprising:

a video channel selection type radio transmission apparatus which is provided on a cable branch side in the cable television network; and a video channel selection type radio reception apparatus which is provided on a subscriber side, wherein said video channel selection type radio transmission apparatus including:

a channel selector for selecting a video signal for a channel designated by a channel selection signal which is transmitted from a subscriber via the video channel selection type radio reception apparatus;

a frequency converter for converting the frequency of said video signal for said channel which is selected by said channel selector to a milliwave band radio frequency and transmitting said video signal; and a receiver and controller for receiving said channel selection signal transmitted from said subscriber and controlling the video signal selecting operation of said channel selector; and said video channel selection type radio reception apparatus including:

a receiver for receiving a video signal transmitted from said video channel selection type radio transmission apparatus, converting the milliwave band frequency of said received video signal to a predetermined frequency and transmitting said video signal to a television receiver of said subscriber; and a transmitter for executing FSK modulation based upon said channel selection signal for designating said channel selected by said subscriber, converting the frequency of the FSK modulation signal to a milliwave band frequency and transmitting the frequency-converted FSK modulation signal to said video channel selection type radio transmission apparatus.

2. A cable television network according to claim 1, wherein said receiver transmits said video signal from an antenna to the television receiver on radio waves.

3. A video channel selection type radio transmission apparatus which is provided on a cable branch side in a cable television network for transmitting video signals to subscribers through cables and which transmits a video signal to a subscriber on radio waves, said apparatus comprising:

a channel selector for converting a video signal for a channel designated by a channel selection signal which is transmitted from a subscriber into an NTSC or PAL video signal;

a transmitter for converting the frequency of said NTSC or PAL video signal to a milliwave band frequency by FM modulation and transmitting said NTSC or PAL video signal from an antenna; and a receiver and controller for receiving said channel selection signal transmitted from said subscriber and controlling the converting operation of said channel selector.

4. A cable television network for transmitting video signals to subscribers through cables, comprising:

a video channel selection type radio transmission apparatus which is provided on a cable branch in the cable television network; and a video channel selection type radio reception apparatus which is provided on a subscriber side, wherein said video channel selection type radio transmission apparatus including:

a channel selector for converting a video signal for a channel designated by a channel selection signal which is transmitted from a subscriber into an NTSC or PAL video signal;

a transmitter for converting the frequency of said NTSC or PAL video signal to a milliwave band frequency by FM modulation and transmitting said NTSC or PAL video signal from an antenna; and a receiver and controller for receiving said channel selection signal transmitted from said subscriber via the video channel selection type radio reception apparatus and controlling the converting operation of said channel selector; and said video channel selection type radio reception apparatus including:

a receiver for receiving a signal transmitted from said video channel selection type radio transmission apparatus, converting said signal into an NTSC or PAL video signal by FM demodulation, and inputting said NTSC or PAL video signal to a television receiver of said subscriber; and a transmitter for transmitting said channel selection signal for designating said channel selected by said subscriber on radio waves.

5. A cable television network according to claim 4, wherein said transmitter of the video channel selection type radio reception apparatus executes FSK modulation based upon said channel selection signal, converts the frequency of the FSK modulation signal to a milliwave band frequency and transmits the frequency-converted FSK modulation signal to said video channel selection type radio transmission apparatus.

* * * * *